United States Patent
Gomes et al.

(10) Patent No.: US 9,696,077 B2
(45) Date of Patent: *Jul. 4, 2017

(54) DUAL CAPILLARY TUBE / HEAT EXCHANGER IN COMBINATION WITH CYCLE PRIMING FOR REDUCING CHARGE MIGRATION

(75) Inventors: Alberto Regio Gomes, St. Joseph, MI (US); Steven J. Kuehl, Stevensville, MI (US); Andrew D. Litch, St. Joseph, MI (US); Guolian Wu, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 821 days.

This patent is subject to a terminal disclaimer.

(21) Appl. No.: 13/400,804

(22) Filed: Feb. 21, 2012

(65) Prior Publication Data

US 2013/0213065 A1    Aug. 22, 2013

(51) Int. Cl.
*F25B 40/00*    (2006.01)
*F25B 5/02*    (2006.01)
(Continued)

(52) U.S. Cl.
CPC ............ *F25B 49/022* (2013.01); *F25B 5/02* (2013.01); *F25B 40/00* (2013.01); *F25D 29/00* (2013.01);
(Continued)

(58) Field of Classification Search
CPC ........ F25B 2600/002; F25B 2600/0216; F25B 2600/2519; F25B 2400/075;
(Continued)

(56) References Cited

U.S. PATENT DOCUMENTS 3,722,228 A    3/1973   Smith
3,977,205 A    8/1976   Dreisziger et al.
(Continued)

FOREIGN PATENT DOCUMENTS

CN    1560544 A    1/2005
EP    0126237 A2   11/1984
(Continued)

OTHER PUBLICATIONS

European Search Report, Application No. 13151509.0-1605/2631568, Jan. 27, 2014, 7 pages.
(Continued)

*Primary Examiner* — Frantz Jules
*Assistant Examiner* — Meraj A Shaikh
(74) *Attorney, Agent, or Firm* — Price Heneveld LLP

(57) ABSTRACT

A refrigerator appliance including a multi-capacity compressor and a refrigerant circuit with two conduits and pressure reducing devices arranged in parallel between an evaporator and a condenser. Refrigerant can flow through one, both or none of the conduits and pressure reducing devices. The appliance also has a heat exchanger in contact with either one pressure reducing device, or one conduit between the pressure reducing device and the valve system. The appliance also includes a controller for priming the compressor above a nominal capacity for a predetermined or calculated duration at the beginning of an ON-cycle.

18 Claims, 12 Drawing Sheets

(51) Int. Cl.
*F25B 5/04* (2006.01)
*F25B 35/04* (2006.01)
*F25B 13/00* (2006.01)
*F25B 1/10* (2006.01)
*F25B 49/02* (2006.01)
*F25D 29/00* (2006.01)

(52) U.S. Cl.
CPC . *F25B 2341/0661* (2013.01); *F25B 2400/052* (2013.01); *F25B 2600/0251* (2013.01); *F25B 2600/0253* (2013.01); *F25B 2600/2511* (2013.01); *Y02B 30/741* (2013.01); *Y02B 40/32* (2013.01)

(58) Field of Classification Search
CPC .... F25B 2400/0751; F25B 5/00; F25B 9/004; F25B 5/02; F25B 5/04; F25B 35/04; F25B 40/00; B60H 1/00914
USPC ......... 62/86, 117, 198, 199, 176.6, 206, 159
See application file for complete search history.

(56) References Cited

U.S. PATENT DOCUMENTS

| | | | |
|---|---|---|---|
| 4,621,501 A | 11/1986 | Tanaka | |
| 5,231,847 A | 8/1993 | Cur et al. | |
| 5,251,455 A | 10/1993 | Cur et al. | |
| 5,261,247 A | 11/1993 | Knezic et al. | |
| 5,272,884 A | 12/1993 | Cur et al. | |
| 5,331,821 A | 7/1994 | Hanson et al. | |
| 5,375,428 A | 12/1994 | LeClear et al. | |
| 5,377,498 A * | 1/1995 | Cur | F25B 40/00 62/176.6 |
| 5,400,609 A | 3/1995 | Sjoholm et al. | |
| 5,410,889 A | 5/1995 | Sjoholm et al. | |
| 5,465,591 A * | 11/1995 | Cur | F25B 5/02 62/199 |
| 5,477,915 A * | 12/1995 | Park | F25B 5/04 165/206 |
| 5,715,693 A | 2/1998 | Van der Walt et al. | |
| 5,758,514 A | 6/1998 | Genung et al. | |
| 5,904,049 A | 5/1999 | Jaster et al. | |
| 6,038,874 A * | 3/2000 | van der Walt | F25B 5/04 62/198 |
| 6,178,761 B1 * | 1/2001 | Karl | B60H 1/00914 62/159 |
| 6,289,691 B1 | 9/2001 | Kim et al. | |
| 6,336,337 B1 | 1/2002 | Yang et al. | |
| 6,438,978 B1 | 8/2002 | Bessler | |
| 6,698,234 B2 | 3/2004 | Gopalnarayanan et al. | |
| 6,769,265 B1 * | 8/2004 | Davis | F25D 17/065 62/187 |
| 7,028,492 B2 | 4/2006 | Taras et al. | |
| 7,448,226 B2 * | 11/2008 | Yamashita | F25B 5/02 236/DIG. 9 |
| 7,451,609 B2 | 11/2008 | Umeoka et al. | |
| 7,980,093 B2 * | 7/2011 | Kuehl | F04B 35/04 62/435 |
| 2003/0233838 A1 | 12/2003 | Lee et al. | |
| 2006/0016214 A1 * | 1/2006 | Gorbounov | F25B 13/00 62/513 |
| 2007/0193287 A1 | 8/2007 | Ishida et al. | |
| 2008/0190125 A1 * | 8/2008 | Yoshioka | F25B 1/10 62/208 |
| 2008/0302113 A1 * | 12/2008 | Yin | F25B 9/008 62/115 |
| 2009/0049849 A1 | 2/2009 | Kim | |
| 2011/0030397 A1 | 2/2011 | Taras | |
| 2011/0036117 A1 | 2/2011 | Frohling et al. | |
| 2011/0146266 A1 | 6/2011 | Weinbrenner et al. | |

FOREIGN PATENT DOCUMENTS

| | | | | |
|---|---|---|---|---|
| EP | 0921363 | A2 | 6/1999 | |
| EP | 1215454 | A2 | 6/2002 | |
| EP | 1707899 | A2 | 10/2006 | |
| JP | EP 0126237 | A2 * | 11/1984 | ............ C09K 5/044 |
| JP | 1174864 | A | 7/1989 | |
| JP | 11062832 | A | 3/1999 | |
| JP | 200029437 | A | 11/2000 | |
| JP | 2004353522 | A | 12/2001 | |
| JP | 2002022289 | A | 1/2002 | |
| JP | 2005214522 | A | 8/2005 | |
| KR | 20080086160 | A | 9/2008 | |

OTHER PUBLICATIONS

European Search Report, Application No. 13151508.2-1605/2631578, Oct. 6, 2014, 6 pages.

European Patent Application No. 13151505.8, Publication No. 2631572, Applicant: Whirlpool Corporation, date of filing Jan. 16, 2013, European Search re: same having a mail date of Oct. 6, 2014.

* cited by examiner

US 9,696,077 B2

DUAL CAPILLARY TUBE / HEAT EXCHANGER IN COMBINATION WITH CYCLE PRIMING FOR REDUCING CHARGE MIGRATION

STATEMENT REGARDING FEDERALLY SPONSORED RESEARCH AND DEVELOPMENT

This invention was made with government support under Award No. DE-EE0003910, awarded by the U.S. Department of Energy. The government has certain rights in the invention.

FIELD OF THE INVENTION

The present invention relates to refrigeration appliances and refrigeration methods of operation. More particularly, the invention relates to refrigeration configurations and methods to improve system efficiency by minimizing maldistribution of refrigerant within the sealed system.

BACKGROUND OF THE INVENTION

Many conventional refrigeration systems used in refrigerator appliances, for example, rely on a sealed configuration allowing refrigerant flow through a circuit with a compressor, a condenser, a pressure reduction device and an evaporator. When the system is called on to cool a refrigeration compartment in the appliance, the compressor operates to increase the pressure and temperature of the refrigerant existing in a vapor state. The refrigerant vapor then travels through the condenser, where it is condensed into a liquid state at constant pressure and temperature. The liquid refrigerant then passes through the pressure reduction device, and experiences a significant drop in pressure. This results in evaporation of the refrigerant and a significant decrease in the temperature of the refrigerant. The refrigerant, now in a liquid/vapor state, passes through the evaporator. There, the refrigerant is typically fully vaporized by warmer air that is passed over the evaporator from the compartment intended to be cooled. The process then repeats as the refrigerant vapor is suctioned back into the compressor.

In general, conventional refrigeration systems operate at a high efficiency when the refrigerant exiting the condenser is in a completely liquid state and the refrigerant exiting the evaporator is in a completely vapor state. These refrigerant conditions are possible during steady-state operation of the compressor during a cycle of cooling one or more refrigeration compartments in the appliance. Compressors used in conventional refrigeration systems are also designed and sized to operate under a variety of ambient temperature and humidity conditions (e.g., tropical environments), and to properly cool refrigeration compartments in the appliance under a variety of transient conditions (e.g., a large mass of hot food has been introduced into the appliance).

Consequently, conventional systems rarely operate in a continuous, steady-state mode with high efficiency. At certain times, the system turns the compressor OFF when cooling of a compartment is not necessary. The system might later turn the compressor back ON when cooling is necessary because, for example, the temperature in a refrigeration compartment has exceeded a set point. During these down periods, however, refrigerant will re-distribute in the circuit. Often refrigerant in a liquid state will migrate through the circuit and pool in the evaporator. Consequently, the system will need some period of time to re-distribute the refrigerant within the circuit upon start-up of the compressor when cooling of a compartment is required. During these periods, the system is operating far below the efficiencies achieved when the refrigerant is in a completely liquid state at the exit of the condenser and completely vapor state at the exit of the evaporator.

Efficiency losses on the order of 5-10% may result from the effects of refrigerant migration during compressor OFF cycles in conventional refrigeration systems. The refrigerant is often not in an ideal state throughout the refrigerant circuit during the initial phase of a compressor ON cycle. Moreover, when warm refrigerant has migrated from the condenser to the evaporator during a period when the compressor is not operating, efficiency is lost from heat transfer of the warmer refrigerant in the evaporator to the refrigeration compartment. The use of heat exchanging members (e.g., suction line heat exchangers and intercoolers) in some refrigeration systems also can exacerbate the problem. Heat exchangers in contact with the compressor inlet and evaporator inlet lines can improve system efficiency during steady-state operation. However, they tend to prolong the effects of refrigerant migration during compressor OFF cycles by inhibiting the mass flow rate of the refrigerant through the refrigerant circuit upon the initiation of a compressor ON cycle.

Consequently, what is needed is a system that not only maximizes steady-state efficiency, but also has improved efficiency during the initial phase of a compressor ON cycle. Conventional systems are not designed to address refrigerant migration. Indeed, many conventional systems exacerbate the problem by employing heat exchanging elements designed to only improve efficiency during steady-state operation of the compressor.

The refrigerator appliances, and methods associated with operating them, related to this invention address these problems. They allow for the design of control logic that considers the location and condition of the refrigerant in the refrigerant circuit. When refrigerant has disadvantageously migrated within the circuit during a compressor OFF-cycle, for example, the appliances and methods according to the invention can operate to improve overall system efficiency. They achieve these gains by taking an unconventional approach to the operation of the appliance during the relatively short, initial phase of a compressor-ON cycle. Very generally, these appliances and associated methods are structured to allow for operation of the appliance at a sub-optimal thermodynamic efficiency during the beginning of a compressor-ON cycle. The immediate emphasis is on an efficient and speedy re-distribution of the refrigerant. Accordingly, the appliance can move into a more efficient, steady-state operational regime at an earlier time than conventional systems, thereby improving overall system efficiency.

SUMMARY OF THE INVENTION

One aspect of the present invention is to provide a refrigerator appliance, including a first refrigeration compartment, a condenser, at least one evaporator in thermal communication with the first refrigeration compartment, a refrigerant, and a multi-capacity compressor with a maximum capacity, a minimum capacity, and a nominal capacity. The appliance further includes a refrigerant circuit arranged to allow flow of the refrigerant between the condenser, each evaporator and the compressor, wherein the refrigerant circuit includes a primary and a secondary evaporator conduit arranged in parallel between the condenser and each evaporator. The appliance also includes a primary pressure reducing device configured within each primary evaporator conduit and a secondary pressure reducing device configured within each secondary evaporator conduit, wherein the primary and the secondary pressure reducing devices are set at different pressure reduction levels. The appliance additionally includes a valve system configured within the primary and the secondary evaporator conduits, wherein the valve system is capable of selectively directing or restricting flow of the refrigerant through each one, or all, of the evaporator conduits arranged in parallel between the condenser and each evaporator. The appliance also includes a heat exchanging member in thermal contact with the primary evaporator conduits, but not the secondary evaporator conduits, wherein the thermal contact is either at a location downstream of the valve system and upstream from the primary pressure reducing device or at the primary pressure reducing device. In addition, the appliance has a controller for controlling the valve system and the compressor to maintain the first refrigeration compartment at any of a plurality of selectable temperatures, wherein the controller is configured to distribute the refrigerant in the circuit to effect substantial sub-cooling of the refrigerant in the condenser or superheating of the refrigerant in each evaporator, upon the initiation of a compressor ON-cycle.

Another aspect of the present invention is to provide a method of operating a refrigerator appliance. The refrigerator appliance has a refrigeration compartment, an evaporator in thermal communication with the refrigeration compartment, a condenser, a refrigerant, a compressor, a refrigerant circuit between the condenser, the evaporator and the compressor, and a primary and a secondary pressure reducing device arranged in parallel within the refrigerant circuit between the condenser and the evaporator. The method includes the step of providing a heat exchanging member in thermal contact with the portion of the refrigerant circuit between the condenser and the evaporator containing the primary pressure reducing device, but not in thermal contact with the portion of the circuit containing the secondary pressure reducing device. The method also includes the steps of providing the compressor in a multi-capacity configuration with a maximum capacity, minimum capacity, and a nominal capacity, and providing a valve system in the refrigerant circuit between the condenser and the evaporator. The method further includes the steps of operating the compressor and the valve system to cause flow of the refrigerant through the refrigerant circuit to chill the evaporator during a compressor ON-cycle; and operating the valve system and the compressor to maintain the refrigeration compartment at any of a plurality of selectable temperatures. The method additionally includes the step of operating the valve system and the compressor to distribute the refrigerant in the circuit to effect substantial sub-cooling of the refrigerant in the condenser or superheating of the refrigerant in the evaporator, upon the initiation of the compressor ON-cycle.

DETAILED DESCRIPTION

For purposes of description herein, the invention may assume various alternative orientations, except where expressly specified to the contrary. Further, the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
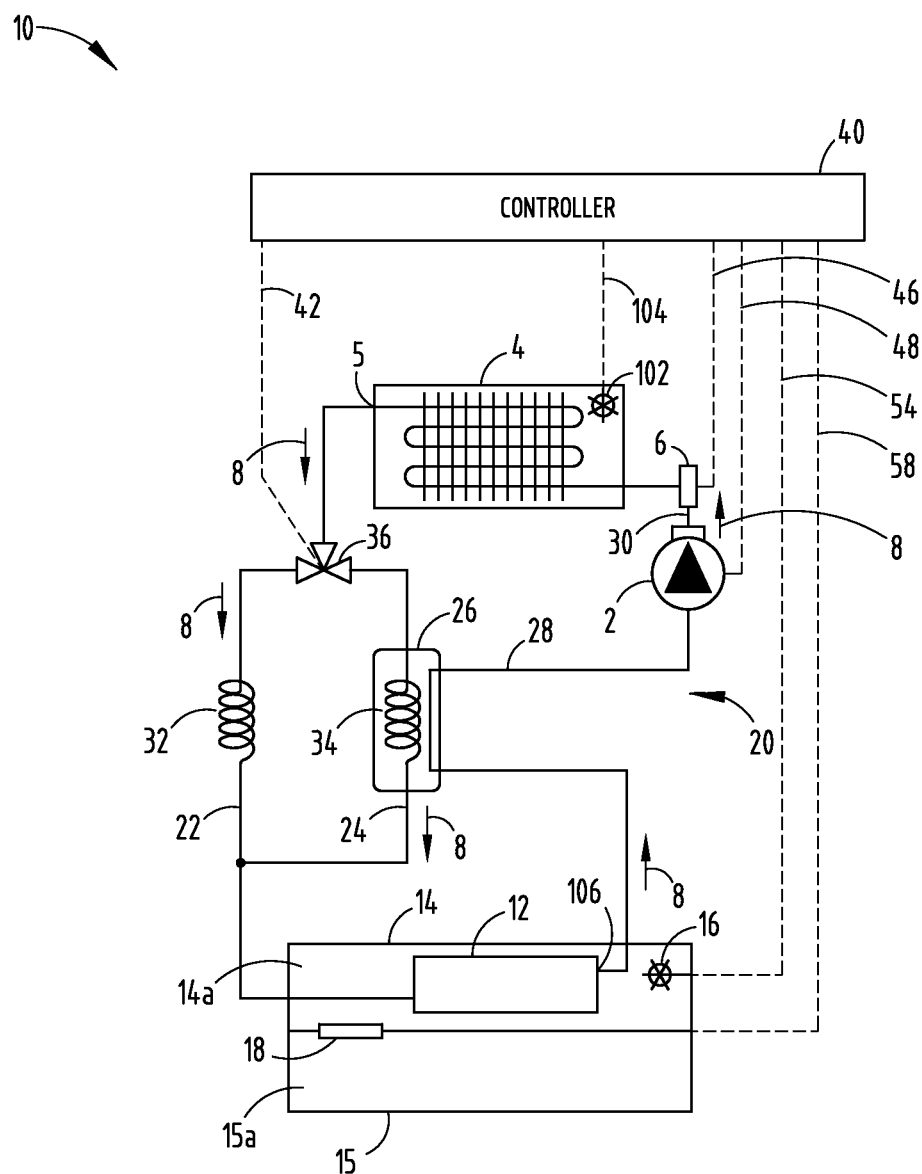
FIG. 1 is a refrigeration circuit diagram depicting a configuration that includes a condenser, a compressor, an evaporator, two refrigeration compartments, two pressure reduction devices arranged in parallel between the evaporator and the condenser, and a suction line heat exchanger in thermal contact with one of the pressure reduction devices.
Figure 2:
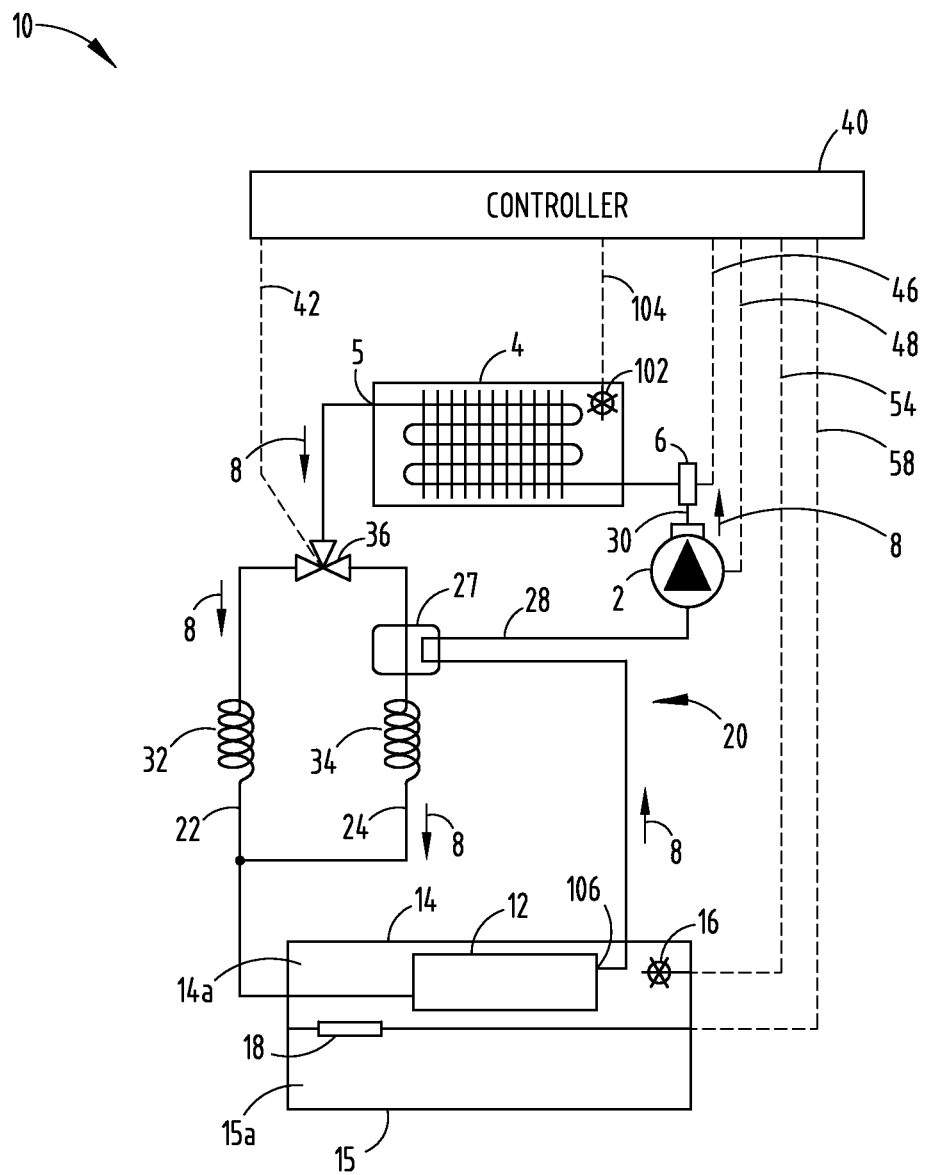
FIG. 2 is a refrigeration circuit diagram depicting a configuration that includes a condenser, a compressor, an evaporator, two refrigeration compartments, two pressure reduction devices arranged in parallel between the evaporator and the condenser, and an intercooler in thermal contact with one of the pressure reduction devices.

FIGS. 1 and 2 each provide a schematic illustrating refrigerator appliance 10 with a refrigeration circuit and control components. Refrigerant circuit 20 includes a series of conduits allowing flow of refrigerant 8 through a compressor 2, condenser 4, pressure reduction devices 32 and 34, a first evaporator 12 and then back to the compressor 2. In particular, compressor 2 supplies refrigerant 8 through compressor outlet line 30 to condenser 4. A check valve 6 may be placed in the compressor outlet line 30 to prevent reverse migration of refrigerant back into the compressor 2 during compressor OFF cycles, for example. Refrigerant 8 then flows out of condenser 4 and is presented to valve system 36. In the embodiments depicted in FIGS. 1-2, valve system 36 is a three-way valve capable of directing or restricting refrigerant 8 flow through secondary evaporator conduit line 22, primary evaporator conduit line 24, or both lines 22 and 24. The evaporator conduit lines 22 and 24 in refrigerant circuit 20 merge upstream of evaporator 12, permitting flow of refrigerant 8 into evaporator 12. Refrigerant 8 exits evaporator 12 and flows through compressor inlet line 28, thus completing refrigerant circuit 20.

In the embodiments depicted in FIGS. 1-2 (and others discussed later), valve system 36 can include one or more of the following types of valves: solenoid-driven, single inlet and single outlet-type valves; solenoid-driven single inlet and selectable-outlet type valves; and stepper-motor driven single inlet and selectable-outlet type valves. Other types of valves or structures (e.g., manifolds) known in the art are permissible for use in valve system 36 that perform the intended three-way function of either line open, both lines open or both lines closed for the depicted system.

As will also be appreciated by those skilled in the art, refrigerant 8 can be composed of any of a number of conventional coolants employed in the refrigeration industry. For example, refrigerant 8 can be R-134a, R-600a or similar recognized refrigerants for vapor compression systems.

In the embodiments depicted in FIGS. 1 and 2 (and those associated with FIGS. 3 and 4 discussed later), compressor 2 may be a single-speed or single-capacity compressor, appropriately sized based on the particular system parameters of the refrigerator appliance 10. In addition, compressor 2 may also be a multi-capacity compressor capable of operation at any of a finite group of capacities or speeds. Still further, compressor 2 may also be a variable capacity or speed compressor (e.g., a variable speed, reciprocating compressor operating from 1600 to 4500 rpm or ~3:1 capacity range) or a linear compressor, capable of operating within a large range of compressor speeds and capacities.

FIGS. 1 and 2 further depict a refrigerator appliance containing a first refrigeration compartment 14 in thermal communication with first evaporator 12. A first refrigeration compartment fan 16 may be located within the appliance to direct warm air in compartment 14 over the evaporator 12. Air manifolds or other types of heat exchange enhancement structures as known in the art may be arranged to facilitate this heat transfer between evaporator 12 and compartment 14. During operation of the refrigerant circuit 20, for example, the warmer air in compartment 14 flows over evaporator 12 and is cooled by the refrigerant 8 passing through evaporator 12.

The refrigerator appliance 10 depicted in FIGS. 1 and 2 also includes a second refrigeration compartment 15, separated convectively from refrigeration compartment 14 by a damper 18. Damper 18 or some other suitable structure as known in the art may be operated to allow flow of air cooled by first evaporator 12 to convectively extract heat from compartment 15, thereby cooling compartment 15. If fan 16 is used and air flows through damper 18, a return air path is also required (not shown in FIGS. 1 and 2). Return air path structures can be configured as known in the art. Preferably, first refrigeration compartment 14 is maintained at a temperature below 0° centigrade and acts as a freezer compartment in the refrigerator appliance. Also preferable is the use of refrigeration compartment 15 at a temperature above 0° centigrade as a fresh food compartment in the appliance. Other arrangements of refrigeration compartments 14 and 15, first evaporator 12, fan 16 and damper 18 are possible, provided that compartment 14 and 15 remains in thermal contact with evaporator 12.

As shown in FIGS. 1 and 2, secondary pressure reduction device 32 is arranged within secondary evaporator conduit line 22 and primary pressure reduction device 34 is arranged within primary evaporator conduit line 24. When refrigerant 8 existing in a liquid state flows through either, or both, of the pressure reduction devices 32 and 34, it experiences a significant pressure and temperature drop. A substantial quantity of refrigerant 8 flashes to a vapor state during flow through pressure reduction devices 32 and/or 34. Pressure reduction devices 32 and 34 may be constructed as capillary tubes, expansion valves, orifice restrictors, needle valves and/or any other suitable structures known in the art capable of performing the intended function. Furthermore, pressure reduction devices 32 and 34 are each configured to subject refrigerant 8 to different pressure reduction levels. Accordingly, the refrigerant 8 that flows through secondary evaporator conduit line 22 (after exiting secondary pressure reduction device 32) possesses a different temperature and pressure than the refrigerant 8 flowing through primary evaporator conduit line 24 (after exiting primary pressure reduction device 34).

As depicted in the FIG. 1 embodiment, the refrigerant circuit 20 includes a suction line heat exchanger 26 arranged in thermal contact with primary pressure reduction device 34. In the embodiment depicted in FIG. 2, the refrigerant circuit 20 includes an intercooler 27 arranged in thermal contact with the portion of the refrigerant circuit 20 downstream of valve system 36 and upstream of primary pressure reduction device 34. Further, a portion of refrigerant circuit 20 that exits first evaporator 12 and drains into compressor inlet line 28 is also arranged in thermal contact with suction line heat exchanger 26 or intercooler 27.

During nominal (e.g., steady-state) operation conditions of the refrigerator appliance 10, refrigerant vapor 8 exiting first evaporator 12 flows through heat exchanger 26 or intercooler 27 and exchanges heat with relatively warmer refrigerant 8 that passes through pressure reduction device 34 toward evaporator 12. This heat exchange occurs when refrigerant 8 is permitted to flow through pressure reduction device 34 by the valve system 36. Operation of heat exchanger 26 or intercooler 27 to warm refrigerant 8 passing back to the compressor 2 and cool refrigerant 8 that passes through pressure reduction device 34 toward evaporator 12, has the effect of improving the overall thermodynamic efficiency of the appliance during nominal operation conditions.

A controller 40 is also illustrated in FIGS. 1 and 2 for controlling operation of the refrigerator appliance. In general, controller 40 operates the compressor 2 and valve system 36, for example, to maintain refrigeration compartments 14 and 15 at various, desired temperatures. The controller 40 may also operate a condenser fan 102 configured to direct flow of ambient air over condenser 4 to further assist in efficiently maintaining desired temperatures in the refrigeration compartments 14 and 15. Preferably, condenser fan 12 is arranged in proximity to or within a housing associated with condenser 4. In addition, controller 40 may operate damper 18, first refrigeration compartment fan 16 and/or check valve 6 to maintain desired temperatures in refrigeration compartments 14 and 15. Note, however, that check valves are typically passive, not requiring electronic activation. Furthermore, controller 40 may be disposed to control and optimize the thermodynamic efficiency of the refrigerator appliance by controlling or adjusting the fan 102, damper 18, fan 16 and/or check valve 6 components.

Controller 40 is disposed to receive and generate control signals through wiring arranged between and coupled to compressor 2, valve system 36, condenser fan 102, damper 18 and first refrigeration compartment fan 16. In particular, wiring 42, 46 and 48 are arranged to couple controller 40 with valve system 36, check valve 6 and compressor 2, respectively. Further, wiring 54, 58 and 104 are arranged to couple controller 40 with first refrigeration compartment fan 16, damper 18 and condenser fan 102, respectively.

In the embodiments illustrated in FIGS. 1 and 2, controller 40 also relies on refrigeration compartment temperature sensors to perform its intended function within the refrigerator appliance. Controller 40 is coupled to sensors 14a and 15a arranged in refrigeration compartments 14 and 15, respectively, with wiring (not shown in FIGS. 1 and 2). Sensors 14a and 15a generate signals indicative of temperature as a function of time in their respective refrigeration compartments 14 and 15 and send this data to controller 40. Thermistors, thermocouples, and other types of temperature sensors known in the art are suitable for use as sensors 14a and 15a.

As depicted in FIGS. 1 and 2, controller 40 may also rely on condenser exit sensor assembly 5 and/or evaporator exit sensor assembly 106 to evaluate the condition of the refrigerant 8 within refrigerant circuit 20. In particular, sensor assemblies 5 and 106 are configured to measure temperature and/or pressure of the refrigerant 8 at the exit of the condenser 4 and first evaporator 12, respectively. Various combinations of thermistors, thermocouples, and other temperature sensors are permissible for use in sensor assemblies 5 and 106. Also permissible for use in sensor assemblies 5 and 106 are transducers, piezoelectric sensors, and other types of pressure sensors known in the art.

Figure 3:
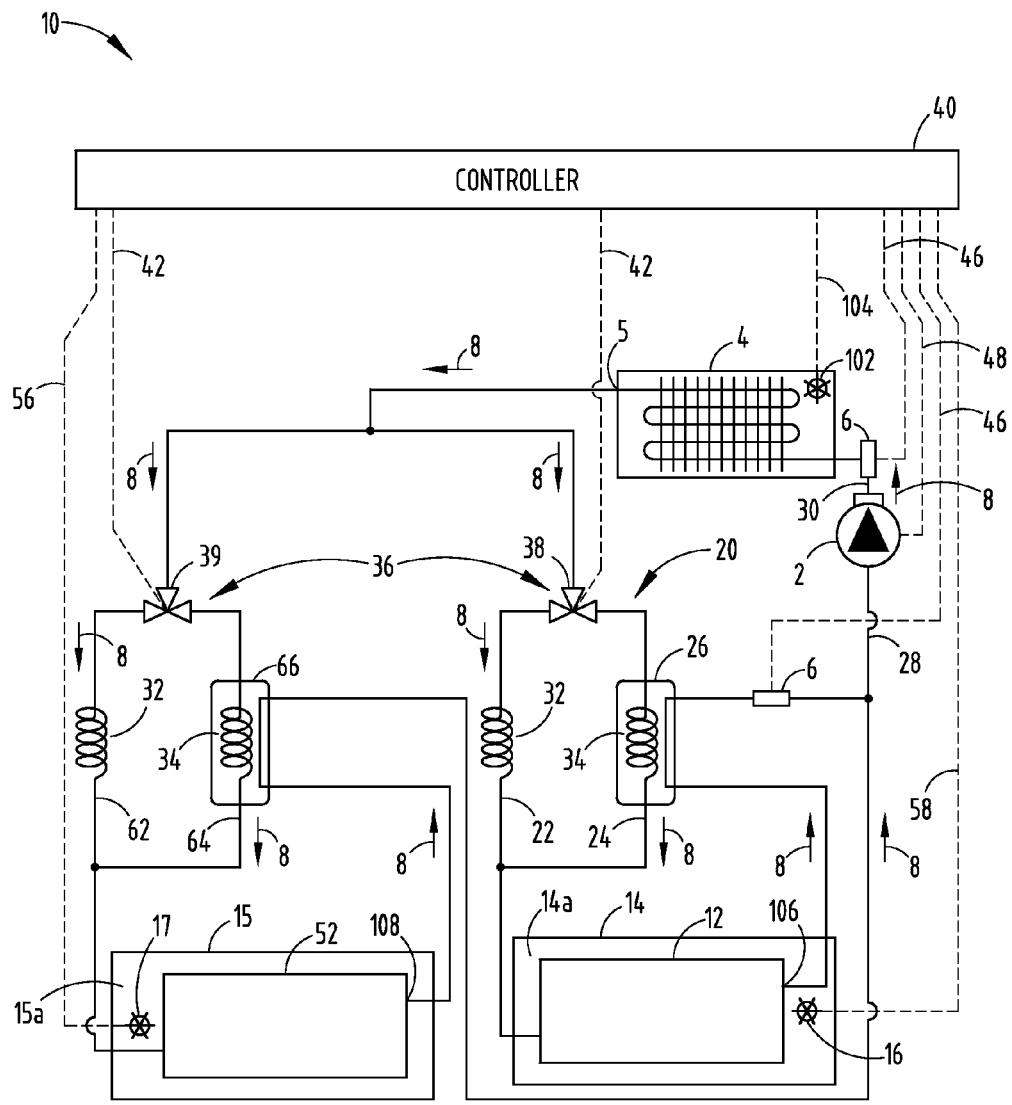
FIG. 3 is a refrigeration circuit diagram depicting a configuration that includes a condenser, a compressor, two evaporators, two refrigeration compartments, two pressure reduction devices arranged in parallel between each evaporator and the condenser, and two suction line heat exchangers, each in thermal contact with one pressure reduction device arranged between the condenser and each evaporator.
Figure 4:
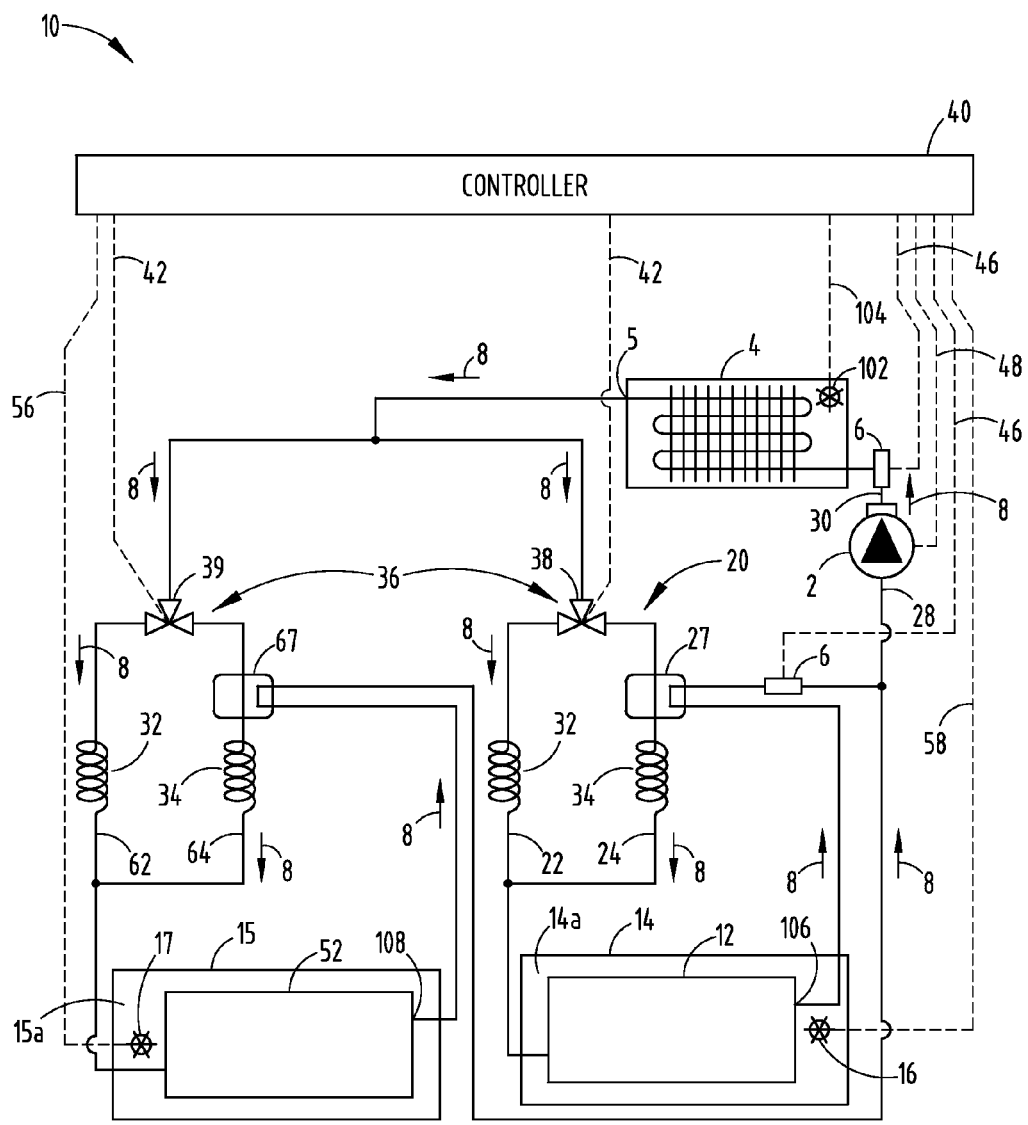
FIG. 4 is a refrigeration circuit diagram depicting a configuration that includes a condenser, a compressor, two evaporators, two refrigeration compartments, two pressure reduction devices arranged in parallel between each evaporator and the condenser, and two intercoolers, each in thermal contact with one pressure reduction device arranged between the condenser and each evaporator.

In FIGS. 3 and 4, refrigerator appliances 10 are illustrated in schematic form with a refrigeration circuit and control components. The appliances depicted in these figures each have two evaporators, first evaporator 12 and second evaporator 52, in contrast to the single evaporator-configurations shown in FIGS. 1 and 2. Accordingly, there are some differences in the refrigerant circuit 20 for these embodiments. After the refrigerant 8 exits condenser 4, it is presented to valve system 36. Here, valve system 36 consists of two, three-way valves: first evaporator primary valve 38 and second evaporator primary valve 39. The valve system 36 can direct or restrict flow of refrigerant 8 to one or both of the first and second evaporators 12 and 52. The types of valves suitable for use here are the same as those mentioned earlier in connection with the valves suitable for use in the appliances illustrated in FIGS. 1-2.

In turn, first evaporator primary valve 38 can direct or restrict flow of refrigerant 8 through one or both of the primary and secondary evaporator conduits 24 and 22, respectively, arranged between first evaporator 12 and valve 38. Thus, refrigerant 8 can flow through either or both of conduits 24 and 22 before these conduits merge into a single inlet into first evaporator 12.

Similarly, the valve system 36 can direct flow of refrigerant 8 to second evaporator primary valve 39. Valve 39 can then direct or restrict flow of refrigerant 8 to one or both of primary and secondary evaporator conduits 64 and 62, respectively, arranged in refrigerant circuit 20 between second evaporator 52 and valve 39. Accordingly, refrigerant 8 then flows through either or both of conduits 64 and 62 before these conduits merge into a single inlet into second evaporator 52.

Also depicted in FIGS. 3 and 4 are pressure reduction devices 34 and 32 arranged in the two sets of evaporator conduits, conduits 24 and 22, along with conduits 64 and 62. If refrigerant 8 is directed by first evaporator primary valve 38 through primary evaporator conduit 24, it will experience a significant pressure drop through primary pressure reduction device 34. Refrigerant 8 that flows through secondary evaporator conduit 22 will experience a significant pressure drop through secondary pressure reduction device 32. Likewise, if refrigerant 8 is directed by second evaporator primary valve 39 through primary evaporator conduit 64, it will experience a significant pressure drop through primary pressure reduction device 34 arranged in the same conduit. Refrigerant 8 that flows through secondary evaporator conduit 62 will experience a significant pressure drop through secondary pressure reduction device 32. Pressure reduction devices 32 and 34 may be capillary tubes, expansion valves, orifice restrictors, needle valves capable of performing the intended function described in the embodiments associated with FIGS. 1 and 2, or any other suitable structures known in the art.

The FIGS. 3 and 4 embodiments also include heat exchanging members arranged in the suction line of refrigerant circuit 20 leading back into compressor inlet line 28. As shown in FIG. 3, suction line heat exchangers 26 and 66 are arranged with the primary evaporator conduits 24 and 64 for first evaporator 12 and second evaporator 52, respectively. Further, heat exchangers 26 and 66 are configured to be in thermal contact with pressure reduction devices 34. In FIG. 4, intercoolers 27 and 67 are arranged in the primary evaporator conduits 24 and 64 for first evaporator 12 and second evaporator 52, respectively. Intercoolers 27 and 67 are also configured in these conduits to be in thermal contact with the portion of refrigerant circuit 20 downstream of valve system 36 and upstream of primary pressure reduction device 34. In addition, a portion of refrigerant circuit 20 that exits evaporators 12 and 52 and drains into compressor inlet line 28 is configured to be the suction line heat exchanger 26 and 66 elements (FIG. 3) or the intercooler 27 and 67 elements (FIG. 4). Also, a check valve 6 is configured in the portion of circuit 20 that exits first evaporator 12. Check valve 6 prevents back flow of refrigerant 8 from the exit of second evaporator 52 into evaporator 12.

As discussed earlier, the embodiments of refrigerator appliance 10 depicted in FIGS. 3 and 4 each rely on two evaporators—first evaporator 12 and second evaporator 52. First evaporator 12 is arranged in thermal communication with first refrigeration compartment 14. First refrigerator compartment fan 16 is arranged in the appliance to direct warm air in compartment 14 over evaporator 12. When compressor 2 is operating and refrigerant 8 is flowing through refrigerant circuit 20, for example, the warm air in compartment 14 may be directed over first evaporator 12 by operation of fan 16. Flow of refrigerant 8 through evaporator 12 cools the warm air in compartment 14 by this operation.

Second evaporator 52 is in thermal communication with second refrigeration compartment 15. Here, second refrigeration compartment fan 17 is arranged in the appliance to direct warm air in compartment 15 over second evaporator 52. During operation of the appliance and compartment fan 17, for example, refrigerant 8 may flow through refrigerant circuit 20 and be directed through evaporator 52. The warm air in second refrigeration compartment 15 that is directed over evaporator 52 by fan 17 is then cooled by the refrigerant 8 flowing through evaporator 52.

The controller 40, wiring and sensors configured in the refrigerator appliances depicted in FIGS. 3 and 4 are generally the same as those discussed for the embodiments depicted in FIGS. 1 and 2. However, controller 40 is also coupled to receive individual control wiring 42 elements for first and second evaporator primary valves 38 and 39 for purposes of controlling cooling operations associated with the appliance. In addition, wiring 56 is coupled to controller 40 and second refrigeration compartment fan 17 to allow controller 40 to operate and control fan 17. Controller 40 is also coupled via wiring 46 to a second check valve 6 that is arranged in the portion of refrigerant circuit 20 that exits first evaporator 12.

Controller 40 can evaluate the condition of refrigerant 8 in the FIGS. 3 and 4 embodiments by evaluating temperature and/or pressure signals as a function of time from condenser exit sensor assembly 5 and/or first evaporator exit sensor assembly 106. Sensor assemblies 5 and 106 operate and function together with controller 40 in the same manner as discussed earlier in connection with the embodiments associated with FIGS. 1 and 2. Furthermore, the controller 40 in the dual-evaporator configuration depicted in FIGS. 3 and 4 may evaluate the temperature and/or pressure signals received from second evaporator exit sensor assembly 108 that are associated with the condition of refrigerant 8 at that location. Sensor assemblies 5, 106 and 108 may be constructed from the same types of temperature and pressure sensors described earlier for the FIGS. 1 and 2 embodiments.

The embodiments of refrigerator appliance 10 in FIGS. 1-4 can each be operated in a similar manner to efficiently cool refrigeration compartments 14 and/or 15 to maintain the temperature in the respective compartments at various, desired temperatures. Controller 40 activates compressor 2 and valve system 36 to cause flow of refrigerant 8 through refrigerant circuit 20 to chill evaporators 12 and/or 52 during a compressor-ON cycle. For example, refrigerant 8 is generally compressed in a vapor state to a higher temperature in compressor 2. Upon entering condenser 4, refrigerant 8 is cooled by the removal of heat at a constant pressure and condenses to a liquid state. Refrigerant 8 is then directed through the valve system 36 and through the pressure reduction devices 32 and/or 34. As refrigerant 8 passes the pressure reduction devices 32 and/or 34, it experiences a significant pressure drop. Much of the refrigerant vaporizes and the temperature of the refrigerant 8 vapor/liquid mixture is decreased. Refrigerant 8 then enters one or more of the evaporators 12 and 52, and typically is completely vaporized by the passage of warm air from compartments 14 and/or 15. Refrigerant 8 then travels back through compressor inlet line 28 into compressor 2 to begin the cycle again through refrigerant circuit 20.

At the very beginning of the compressor-ON cycle, first evaporator 12 and/or 52 each may contain above-optimal quantities of refrigerant 8. If the systems depicted in FIGS. 1-4 were operated in a conventional fashion by directing refrigerant 8 through heat exchanging members 26, 66, 27 and/or 67 during the initial phase of a compressor ON-cycle, a substantial duration of this period would be devoted to the redistribution of refrigerant 8 within refrigerant circuit 20 until it reaches a near-nominal equilibrium state. Thermodynamic efficiencies, however, are optimal once the refrigerant 8 is within a nominal equilibrium state within refrigerant circuit 20.

Accordingly, the refrigerator appliances 10 described in FIGS. 1-4 are configured to bypass the heat exchanging members 26, 66, 27 and 67 during the initial phase of a compressor-ON cycle. While it is typically more efficient to operate these appliances by directing refrigerant through the heat exchanging members (e.g., suction line heat exchangers or intercoolers) during steady-state operation, these appliances have the unique ability of operating differently during the initial phase of a compressor ON-cycle. Higher mass flow rates of refrigerant 8 within refrigerant circuit 20 are possible when the heat exchanging members are bypassed. In FIG. 1, for example, controller 40 directs refrigerant 8 through main valve assembly 36 into secondary evaporator conduit 22 and pressure reduction device 32. This effectively bypasses heat exchanging member 26. Similarly, in FIG. 3, heat exchanging members 26 and 66 are bypassed by the selective flow of refrigerant 8 by first and second evaporator primary valves 38 and 39 through secondary evaporator conduits 22 and 62, respectively. In this manner, the quantities of refrigerant 8 that have pooled in evaporators 12 and/or 52 during compressor-OFF cycles can be quickly re-distributed within refrigerant circuit 20 into a nominal equilibrium state during the initial phase of a compressor ON-cycle.

After refrigerant 8 has reached a near-nominal equilibrium state within refrigerant circuit 20, controller 40 then switches the flow of refrigerant 8 back through evaporator conduits (e.g., conduits 24 and/or 64) in thermal contact with the heat exchanging members. This operation ensures optimal thermodynamic efficiency during steady-state operation. In FIGS. 1 and 2, for example, controller 40 operates valve system 36 to direct flow of refrigerant 8 through primary evaporator conduit 24. Consequently, refrigerant 8 passes through pressure reduction device 34, which is in thermal contact with heat exchanging member 26 (FIG. 1) or through conduit 24 in thermal contact with intercooler 27 (FIG. 2). Controller 40 operates the embodiments shown in FIGS. 3 and 4 in a similar fashion and directs refrigerant 8 through first and second evaporator primary valves 38 and 39 into primary evaporator conduits 24 and 64. This has the effect of directing refrigerant 8 through suction line heat exchangers 26 and 66 (FIG. 3) or intercoolers 27 and 67 (FIG. 4).

The length of time that controller 40 directs refrigerant 8 to bypass heat exchanging members 26, 27, 66 and/or 67 during the initial phase of a compressor-ON cycle can be pre-determined or calculated as a variable. In the former case, the duration can be predetermined (e.g., set as a fixed parameter) based on various system geometries and configurations. In particular, the duration of the heat exchanging member bypass may depend on the quantity of refrigerant in circuit 20, the length and geometry of circuit 20, the size of compressor 2, condenser 4, evaporators 12 and 52, the materials used to fabricate these components, and other factors. In addition, the dynamics of the distribution of refrigerant 8 in the refrigerant circuit 20 depicted in FIGS. 1-4 can be modeled and understood through techniques and measurements as known in the art. Accordingly, the length of time that controller 40 bypasses the heat exchanging elements can be set at one or more values. Multiple settings, for example, may be needed to take into account different degrees of refrigerant migration. The degree of migration may be a function of the length and/or frequency of the compressor OFF-cycles and the current refrigerant 8 condition as evaluated by controller 40 based on inputs from sensor assemblies 5, 106 and 108. Alternatively, the duration of the bypass can be set to a fixed period (e.g., 120 seconds) after the beginning of a compressor-ON cycle, or it may be set for a prescribed time (e.g., 45 minutes) after the power cord of the appliance has been plugged into a power outlet after a significant down period.

Controller 40 may also operate to direct refrigerant 8 to bypass the heat exchanging members 26, 27, 66 and/or 67 depicted in FIGS. 1-4 for a duration that is calculated (e.g., at various times or continuously) based at least on an evaluation of the condition of refrigerant 8. As discussed earlier, controller 40 can ascertain the condition of refrigerant 8 by evaluating the temperature and/or pressure signals received from condenser exit assembly 5 and/or evaporator exit assemblies 106 (FIGS. 1-4) and 108 (FIGS. 3-4). For example, there is equilibrium of refrigerant 8 within circuit 20 when refrigerant 8 exists in a substantially liquid state at the exit of condenser 4 (i.e., Liquid Line Sub-cooling). Similarly, there is also equilibrium in circuit 20 when refrigerant 8 is in a substantially vapor state at the exit of evaporator 12 and evaporator 52, if present. Ideally, refrigerant 8 exists in a superheated, vapor state (0-4° centigrade beyond the corresponding saturation temperature for the particular refrigerant pressure) at the evaporator exit.

Thus, controller 40 can evaluate whether the Liquid Line Sub-cooling and/or

Evaporator Exit Superheat conditions exist for refrigerant 8. When controller 40 detects these conditions through readings from sensor assemblies 5, 106 and /or 108, it can operate the valve system 36 to stop the heat exchanger bypass operation and direct refrigerant 8 back through conduits in thermal contact with the heat exchanging elements within refrigerant circuit 20.

Controller 40 may also assess whether there are Liquid Line Sub-cooling and/or Evaporator Exit Superheat conditions by evaluating the temperatures of refrigeration compartments 14 and 15 (if applicable). Through prior modeling and experimental work (e.g., direct measurements of refrigerant temperature and pressure), it is possible to predict Liquid Line Sub-cooling and/or Evaporator Exit Superheat conditions based on actual temperature measurements in the compartments as a function of time. Another related approach is for controller 40 to cease the heat exchanger bypass operation at the point in which the temperature (warm-up) decay rate in compartments 14 and/or 15 approaches zero, signifying that an effective compartment cooling operation has begun.

In addition, controller 40 may rely on another approach to determine the timing of Liquid Line Sub-cooling and/or Evaporator Exit Superheat conditions for refrigerant 8 within circuit 20. This approach relies on data associated with operation of compressor 2. When compressor 2 is configured as a linear compressor, controller 40 can evaluate the resonant frequency of the piston within the compressor as a function of time. Through experimentation and modeling, the piston frequency response for compressor 2 and/or the derivative of the frequency response can be correlated to the temperature and pressure condition of refrigerant 8 at the exit of condenser 4 and/or the exit of the first and second evaporator 12 and 52. Using this data, it is possible to correlate compressor piston frequencies to the desired Liquid Line Sub-cooling and/or Evaporator Exit Superheat conditions for refrigerant 8. These frequencies can then be used to establish a predetermined duration for the heat exchanger bypass step. Alternatively, controller 40 can evaluate the real-time piston frequency of compressor 2 (e.g., by using vibration sensors coupled to compressor 2 and control wiring coupled to controller 40 as known in the art). It can then calculate the duration of the heat exchanger bypass step based on the prior-developed frequency correlations to the Liquid Line Sub-cooling and/or Evaporator Exit Superheat conditions observed in connection with refrigerant 8.

For refrigerator appliances 10 configured with a general, variable speed or variable capacity compressor (not a linear compressor), it is also possible for controller 40 to evaluate Liquid Line Sub-cooling and/or Evaporator Exit Superheat conditions for refrigerant 8. Here, controller 40 can ascertain the power consumption of compressor 2 as a function of time and/or the derivative of this power consumption. Prior correlations (based on modeling and experimentation as known in the art) of compressor power and/or derivatives of the power to the desired refrigerant 8 conditions (e.g., sub-cooling of the refrigerant 8 at the condenser exit) can be used to set the duration of the heat exchanger bypass step. Preferably, the duration for the bypass step is calculated in real-time by controller 40 based on the power consumption of compressor 2 as a function of time. Some prescribed time (e.g., a few seconds) after the compressor power consumption has peaked is usually an appropriate time to arrest the heat exchanging bypass step. This is because the peak of the compressor power consumption can generally be correlated to the time in which most of refrigerant 8 has reached a sub-cooled state at the exit of the condenser and/or a superheat condition exists at the evaporator exit. Also note that the above approach to setting the duration of the heat exchanger bypass based on compressor power consumption can be employed when compressor 2 is configured as a linear compressor.

The refrigerator appliances 10 depicted in FIGS. 1-4 can also be operated by controller 40 to manage temperature control of refrigeration compartments 14 and 15 during transient conditions. Various situations may arise during operation of these refrigerator appliances that require maximum or higher-than-nominal cooling rates in compartments 14 and 15 to maintain desired temperatures in these compartments. For example, a door to compartment 14 or 15 may be inadvertently left open for a long duration, substantially warming the affected compartment. Similarly, a large quantity of hot food may be introduced into compartment 14 or 15, causing an appreciable rise in compartment temperature. To address these transient conditions, and others, controller 40 may direct flow of refrigerant 8 through both pressure reduction devices 32 and 34 at the same time. This maximizes flow rates to evaporators 12 and 52, thereby imparting significant cooling rates to refrigeration compartments 14 and 15.

Controller 40 may also operate the refrigerator appliances 10 depicted in FIGS. 1-4 in another manner to further address sub-optimal distribution of refrigerant 8 in circuit 20. Right before controller 40 activates compressor 2 at the beginning of a compressor-ON cycle, controller 40 may engage valve system 36 to allow the refrigerant 8 to equalize in pressure within circuit 20. In particular, controller 40 operates valve system 36 to allow pressure equalization and flow of refrigerant 8 into evaporator conduits 22, 24, 62 and/or 64 (see FIGS. 1-4). This operation also has the effect of promoting better distribution of refrigerant 8 in circuit 20, potentially reducing the time necessary to run the appliance in the mode where the heat exchanging members are bypassed.

Controller 40 can impart further efficiency gains by operating the refrigerator appliances 10 depicted in FIGS. 1-4 according to certain procedures at the end of a compressor ON-cycle. For example, controller 40 can engage valve system 36 to restrict flow of refrigerant 8 through evaporator conduits 22 and 24 (FIGS. 1-4), 62 and/or 64 (FIGS. 3-4) and pressure reduction devices 32 and 34 (FIGS. 1-4) at the end of a steady-state compressor-ON cycle. This has the effect of preventing or minimizing the pooling of refrigerant 8 in a liquid state within evaporators 12 and/or 52.

Still further, controller 40 can obtain further thermodynamic efficiencies by operating condenser fan 102 and/or refrigeration compartment fans 16 and 17 at the end of a compressor-ON cycle. Operation of condenser fan 102 serves to further cool refrigerant 8 that exists in a high temperature state upon return to compressor 2 from inlet line 28 and flow into condenser 4. Similarly, the continued short term operation of refrigeration fans 16 and 17 can further extract cooling from the cold, evaporator 12 and/or evaporator 52, even after the compressor 2 is switched OFF during operation.

Figure 5A:
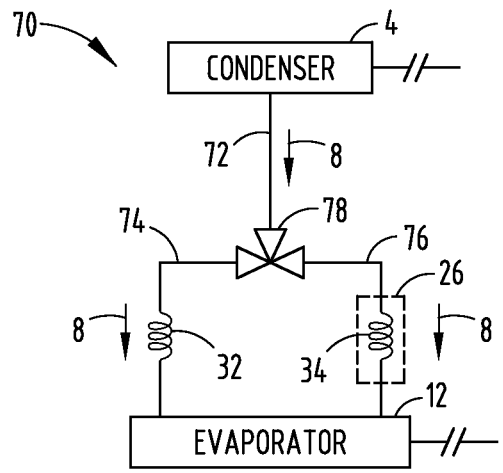
FIG. 5A is a partial refrigeration circuit diagram depicting a valve system with a three-way valve for directing or restricting flow of refrigerant through the pressure reduction devices arranged in parallel between a condenser and an evaporator.
Figure 5B:
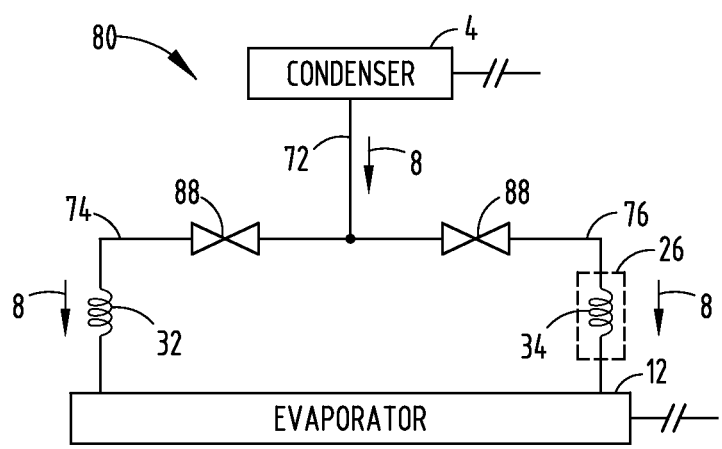
FIG. 5B is a partial refrigeration circuit diagram depicting a valve system with two, two-way valves for directing or restricting flow of refrigerant through the pressure reduction devices arranged in parallel between a condenser and an evaporator.

FIGS. 5A and 5B depict embodiments of valve system (e.g., valve system 36) configurations that may be used in the single-evaporator, refrigerator appliances 10 shown in FIGS. 1-2, for example. In FIG. 5A, three-way valve assembly 70 comprises one three-way valve 78 configured to direct or restrict flow of refrigerant 8 (from condenser 4) through primary evaporator conduit 76 and/or secondary evaporator conduit 74 and pressure reduction devices 34 and 32, respectively. Refrigerant 8 then flows into first evaporator 12. Although the remainder of refrigerant circuit 20 is not shown in FIG. 5A, it is to be understood that refrigerant 8 flows back through heat exchanger 26 or intercooler 27 (not shown) on the way back to compressor 2. Also not shown in FIG. 5A is controller 40, which is coupled to valve 78 for purposes of controlling the flow of refrigerant 8 through the evaporator conduits 74 and 76.

For its part, FIG. 5B depicts a dual, one-way valve assembly 80 for accomplishing the same function as valve assembly 70 in FIG. 5A. Here, three-way valve 78 is replaced with two, one-way valves 88. One, one-way valve 88 is configured for primary evaporator conduit 76 and one, one-way valve 88 is configured for secondary evaporator conduit 74. In all other respects, the configuration for valve assembly 80 in FIG. 5B is identical to the valve assembly 70 configuration depicted in FIG. 5A. Here, controller 40 can also operate either or both of one-way valves 88 to direct or restrict flow of refrigerant 8 through the evaporator conduits 74 and 76.

Figure 6A:
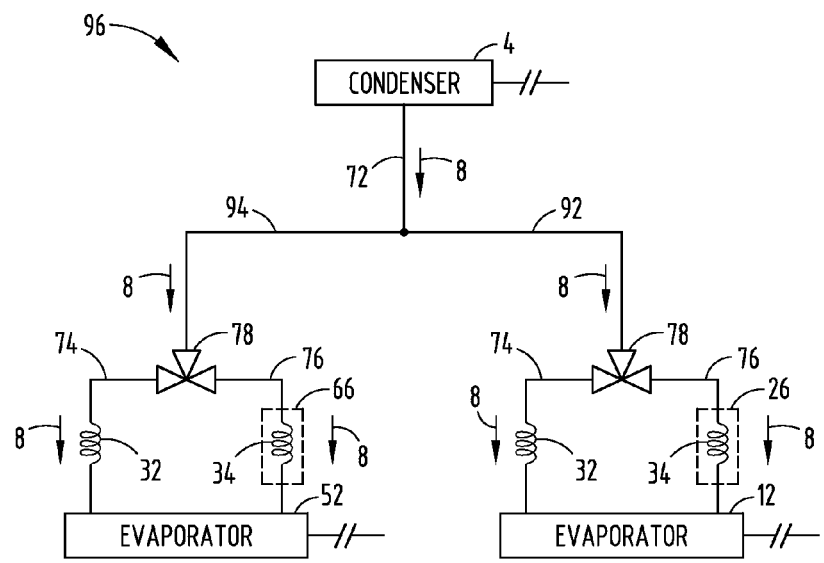
FIG. 6A is a partial refrigeration circuit diagram depicting a valve system with three, three-way valves for directing or restricting flow of refrigerant through the pressure reduction devices arranged in parallel between a condenser and two evaporators.
Figure 6B:
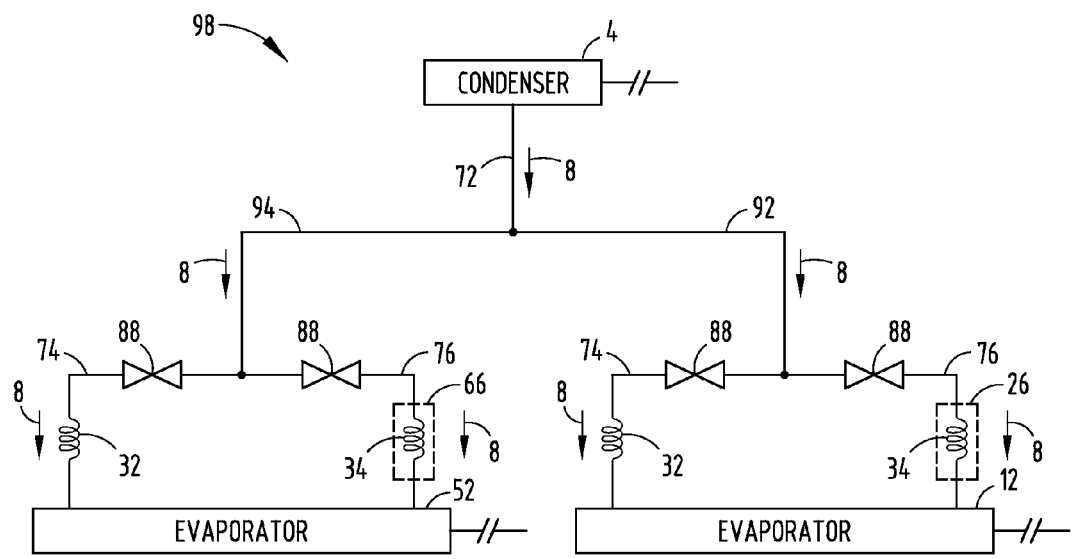
FIG. 6B is a partial refrigeration circuit diagram depicting a valve system with six, two-way valves for directing or restricting flow of refrigerant through the pressure reduction devices arranged in parallel between a condenser and two evaporators.

FIGS. 6A and 6B depict various embodiments of valve system (e.g., valve system 36) configurations that may be employed in the dual-evaporator, refrigerator appliance embodiments illustrated in FIGS. 3-4. In FIG. 6A, the dual-evaporator refrigerator appliance 10 relies on a valve assembly 96 comprised of two, three-way valves 78 configured to direct or restrict flow of refrigerant 8 through the two sets of evaporator conduits 74 and 76 arranged between first evaporator 12 and condenser 4, and second evaporator 52 and condenser 4. Although not illustrated in FIG. 6A, a controller 40 coupled to each valve 78 can effectively direct or restrict flow of refrigerant 8 through each of the evaporator conduits arranged in refrigerant circuit 20 between evaporators 12 and 52, and condenser 4.

In FIG. 6B, valve assembly 98 relies on four, one-way valves 88 as a replacement for the two, three-way valves depicted in FIG. 6A. Again, in all other respects, the configuration for valve assembly 98 in FIG. 6B has the identical function as the valve assembly 96 depicted in FIG. 6A.

Valve systems and assemblies that properly function with the refrigerator appliances 10 depicted in FIGS. 1-4 are not exclusive to those discussed earlier and illustrated in FIGS. 5A, 5B, 6A and 6B. Various combinations of one-way and three-way valves of various types (e.g., valve 78, valve 88) can be employed in the evaporator conduits within these single- and dual-evaporator refrigerator appliances. Although not depicted in FIGS. 5A-6B, two-way valves may also be employed in these valve systems and assemblies. These valves can direct or redirect flow of refrigerant 8 through either one of two outlets. For example, two-way valves 38a and 39a may be configured in the arrangement shown in FIG. 3 as replacements for three-way valves 38 and 39 (or as replacements for valves 78 in FIG. 6A) along with one additional two-way valve positioned upstream of the 38a and 39a two-way valves and downstream from condenser 4. Preferably, controller 40 should be capable of controlling the valve combination to direct or restrict flow of refrigerant 8 through the evaporator conduits arranged in refrigerant circuit 20 between each evaporator (e.g., first evaporator 12, and second evaporator 52) and the condenser 4.

Other variants of the single- and dual-evaporator refrigerator appliance 10 and methods illustrated and discussed in connection with FIGS. 1-4 are viable. For example, refrigerator configurations with only one refrigeration compartment, e.g., compartment 14, are suitable for high efficiency operation according to the invention, including the heat exchanging member bypass operation discussed above. For these appliances, at least one evaporator 12 should be arranged in thermal communication with the compartment 14. As another example, a multi-evaporator/refrigerator appliance 10 can employ a multi-inlet type compressor for the compressor 2 element. In this scenario, each inlet of compressor 2 requires a dedicated suction line from each evaporator arranged in refrigerator appliance 10.

Various refrigerator appliance configurations with single or multiple evaporators are also possible. However, at least two evaporator conduits (e.g., 22 and 24) and at least two pressure reduction devices (e.g., 32 and 34) should be configured in parallel in refrigerant circuit 20 between each evaporator associated with the appliance and the condenser 4. Thus, a set of two or more evaporator conduits should be configured in parallel within refrigerant circuit 20 and arranged such that the set is associated with one evaporator. Another set of evaporator conduits should be arranged for the next evaporator arranged in the appliance, and so on. In addition, a heat exchanging element (e.g., suction line heat exchanger 26, intercooler 27, etc.) should be arranged in thermal contact with one, but not all of, the evaporator conduits downstream of the valve system 36 arranged between each evaporator and the condenser. Alternatively, the heat exchanging member can be placed in thermal contact with one, but not all of, the pressure reduction devices.

The refrigerator appliance 10 embodiments depicted in FIGS. 7-12 rely on a different approach to maximizing overall thermodynamic efficiency. Like the embodiments depicted in FIGS. 1-4, these configurations and associated methods are structured to evaluate and control the distribution of refrigerant 8 within refrigerant circuit 20 at the beginning of a compressor-ON cycle. Instead of directing refrigerant 8 to bypass the heat exchanging members within the circuit, the appliances illustrated in FIGS. 7-12 make use of a high-speed or high-capacity compressor operation to prime or displace the refrigerant 8 back into an equilibrium state within the circuit. Accordingly, compressor 2 cannot be configured as a single-speed or single-capacity compressor. Rather, compressor 2 is configured as a multi-capacity compressor capable of operation at multiple, finite capacities or speeds; a variable capacity or speed compressor, capable of operation within a spectrum of capacities or speeds (e.g., variable speed compressor operating from approximately 1600 to 4500 rpm); or a linear compressor also capable of operating within a spectrum of speeds and capacities (e.g., an Embraco (Whirlpool SA) Britten compressor operating at 30 to 160 W). Further, compressor 2 should be capable of operation at maximum (e.g., near 4500 rpm), minimum (e.g., near 1600 rpm) and nominal capacity levels, among other settings. In general, the nominal capacity of compressor 2 is about 35% of the difference between its maximum and minimum capacity levels (e.g., 0.35*(4500−1600 rpm) =~1015 rpm).

Figure 7:
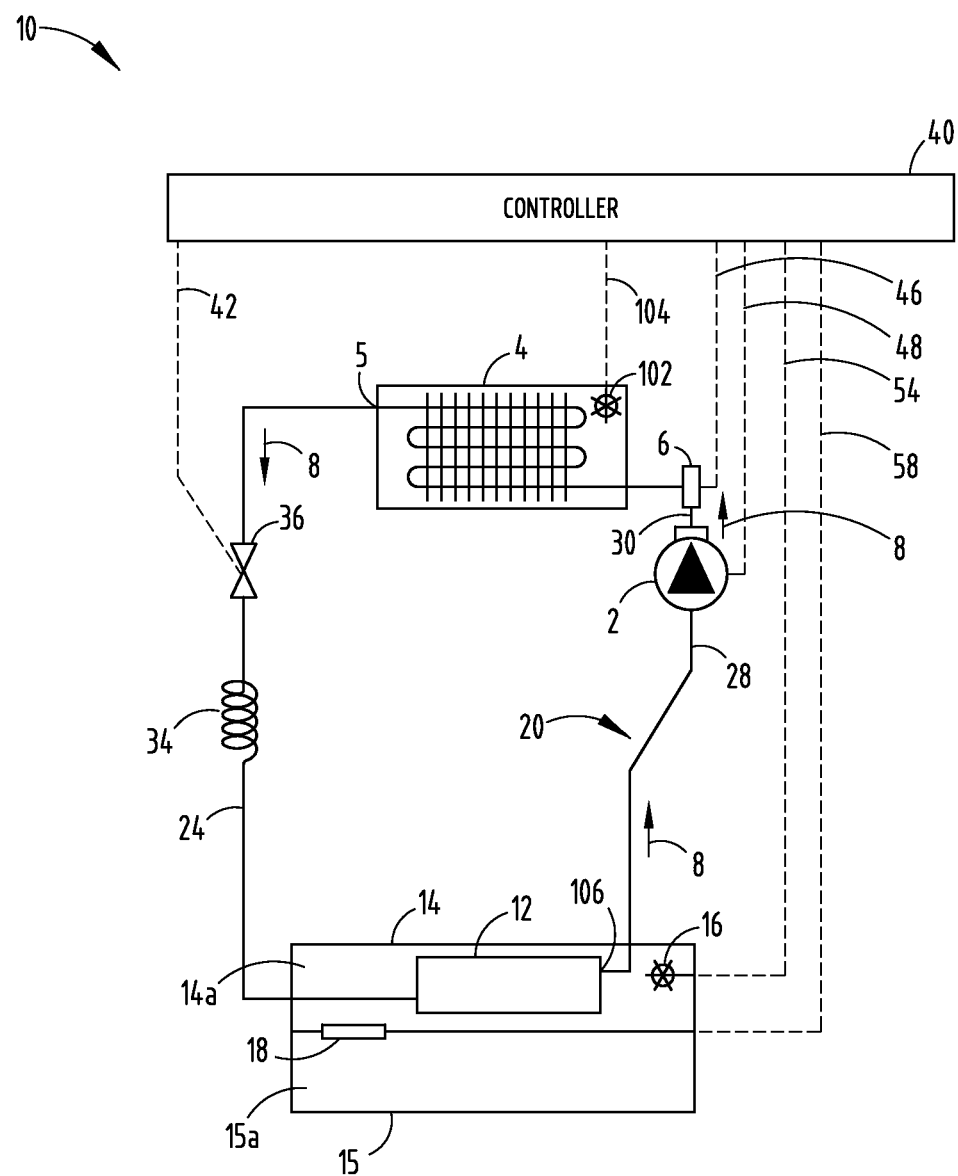
FIG. 7 is a refrigeration circuit diagram depicting a configuration that includes a condenser, a compressor, an evaporator, two refrigeration compartments, and a pressure reduction device arranged between the evaporator and the condenser.
Figure 9:
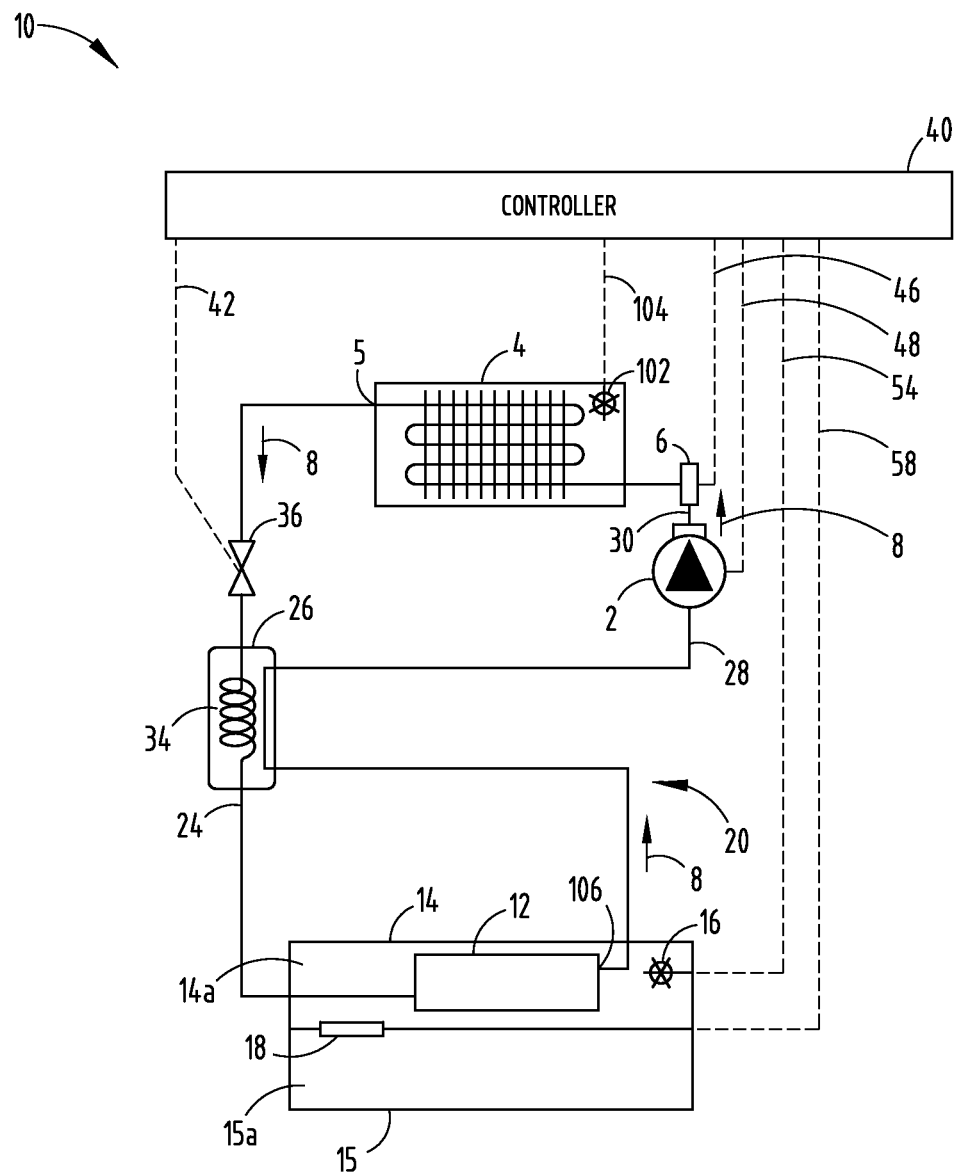
FIG. 9 is a refrigeration circuit diagram depicting a configuration that includes a condenser, a compressor, an evaporator, two refrigeration compartments, a pressure reduction device arranged between the evaporator and the condenser, and a suction line heat exchanger in thermal contact with the pressure reduction device.
Figure 11:
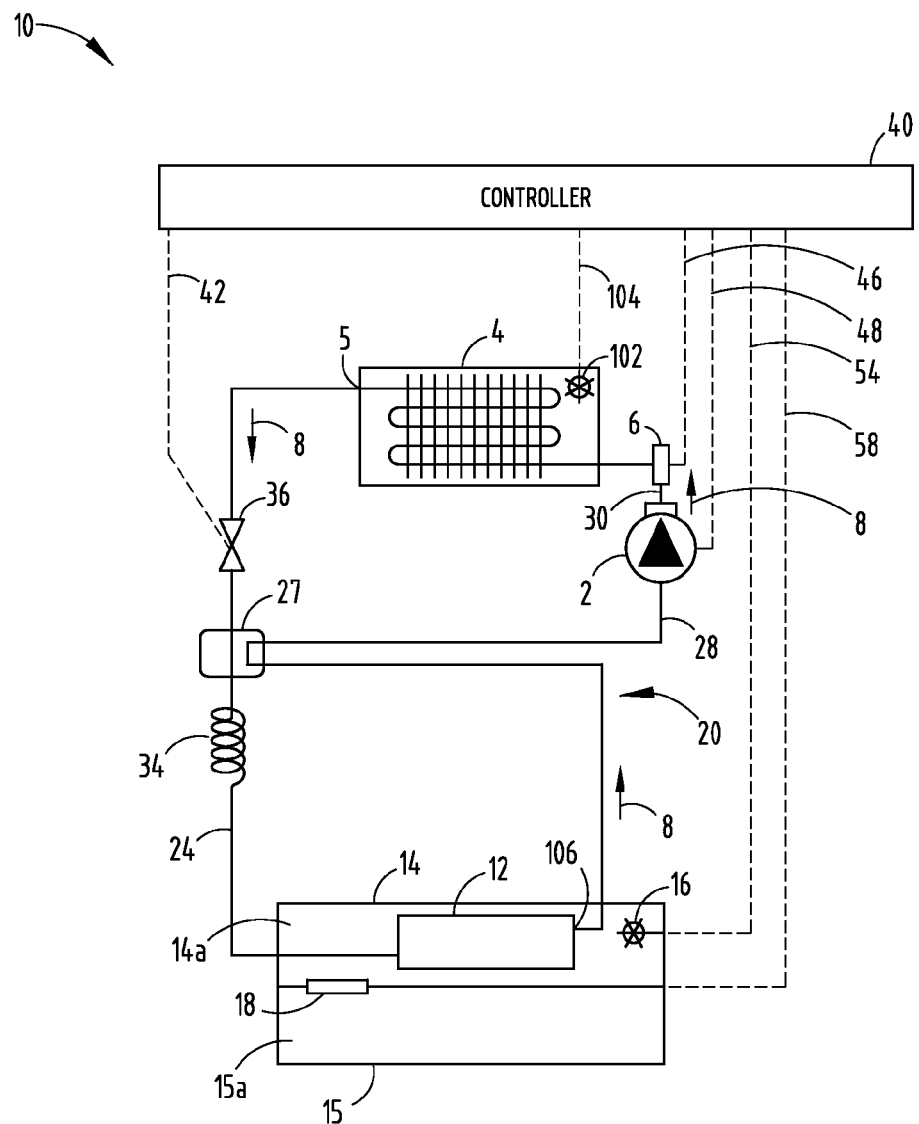
FIG. 11 is a refrigeration circuit diagram depicting a configuration that includes a condenser, a compressor, an evaporator, two refrigeration compartments, a pressure reduction device arranged between the evaporator and the condenser, and an intercooler in thermal contact with a portion of the refrigeration circuit upstream of the pressure reduction device.

In large part, the single-evaporator refrigerator appliance embodiments depicted in FIGS. 7, 9, and 11 are similar to the embodiments illustrated in FIGS. 1 and 3. There is one significant difference, however. Only one conduit, primary evaporator conduit 24, is arranged between condenser 4 and first evaporator 12. Accordingly, only one pressure reduction device 34 is configured within refrigerant circuit 20 between first evaporator 12 and condenser 4. Since valve system 36 only needs to direct or restrict flow of refrigerant 8 from condenser 4 through pressure reduction device 34 (and evaporator conduit 24), it can rely on one, one-way valve (e.g., a valve equivalent to valve 88 in FIG. 5B). Other types of valves as known in the art may also be used, provided that they serve the prescribed function.

The refrigerator appliance 10 illustrated in FIG. 7 differs from the embodiments shown in FIGS. 1 and 3 in one other respect. Here, the appliance has no heat exchanging element (e.g., heat exchanger 26 or intercooler 27) arranged within refrigerant circuit 20. Consequently, the drain line from first evaporator 12 directly feeds into compressor inlet line 28 with no thermal contact with primary evaporator conduit 24 or pressure reduction device 34. Note, however, that the refrigerator appliances 10 depicted in FIGS. 9 and 11 do possess a suction line heat exchanger 26 or an intercooler 27, respectively, and these heat exchanging elements and associated conduits are arranged similar to their counterparts depicted in FIGS. 1 and 3.

Figure 8:
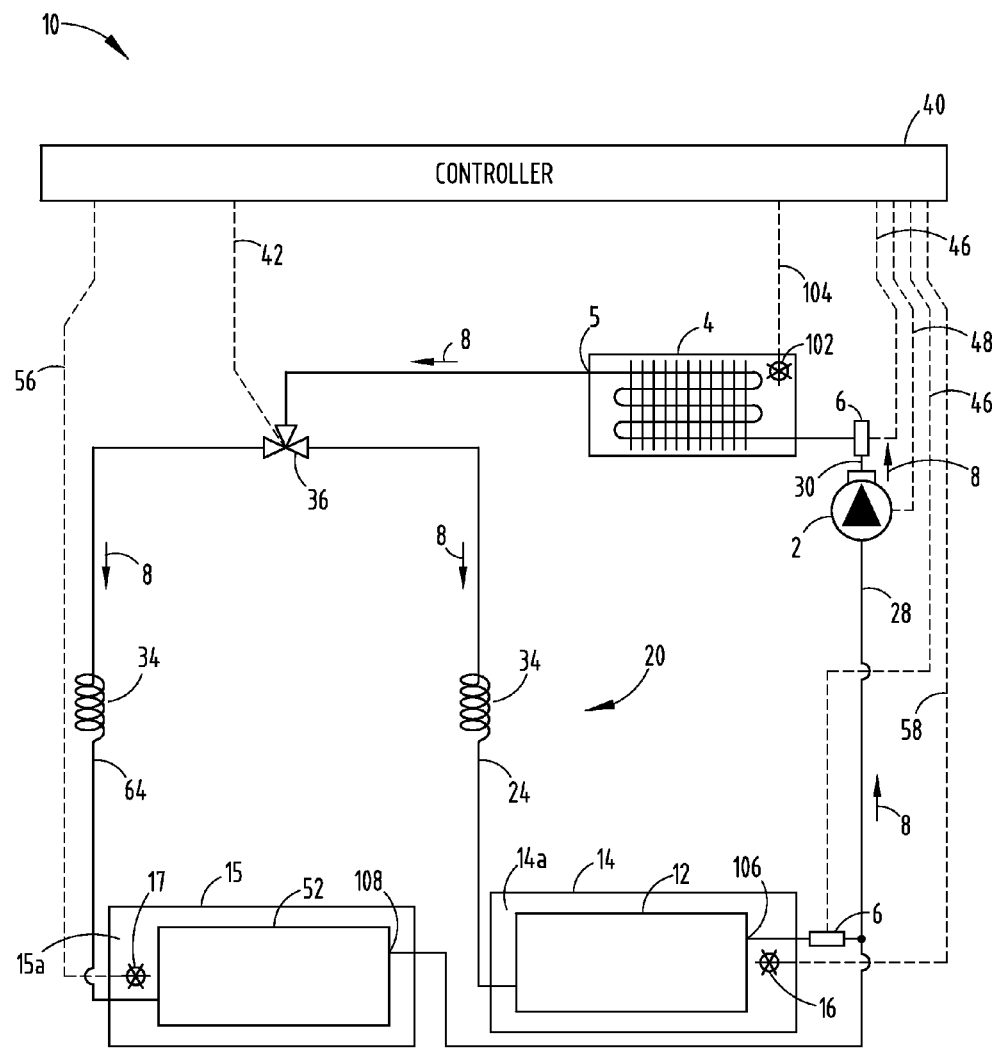
FIG. 8 is a refrigeration circuit diagram depicting a configuration that includes a condenser, a compressor, two evaporators, two refrigeration compartments, and a pressure reduction device arranged between each evaporator and the condenser.
Figure 10:
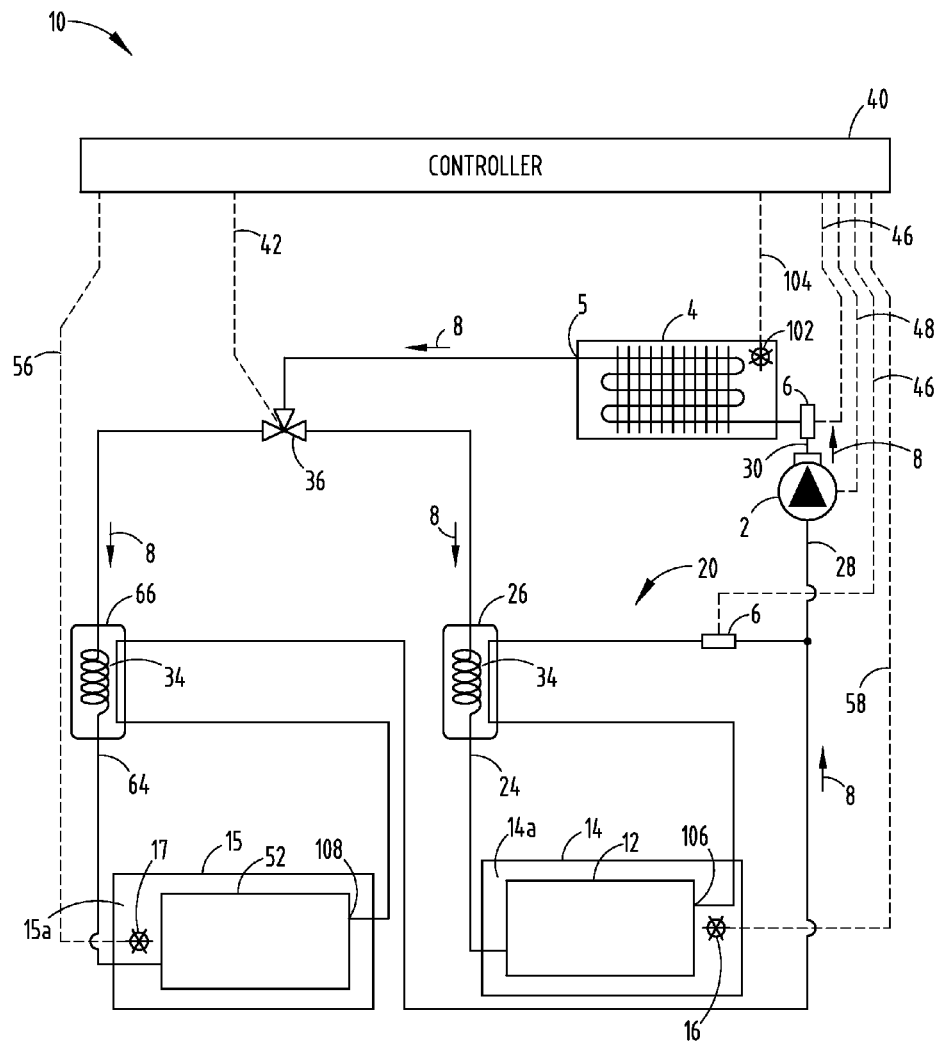
FIG. 10 is a refrigeration circuit diagram depicting a configuration that includes a condenser, a compressor, two evaporators, two refrigeration compartments, a pressure reduction device arranged between each evaporator and the condenser, and a suction line heat exchanger in thermal contact with each pressure reduction device.
Figure 12:
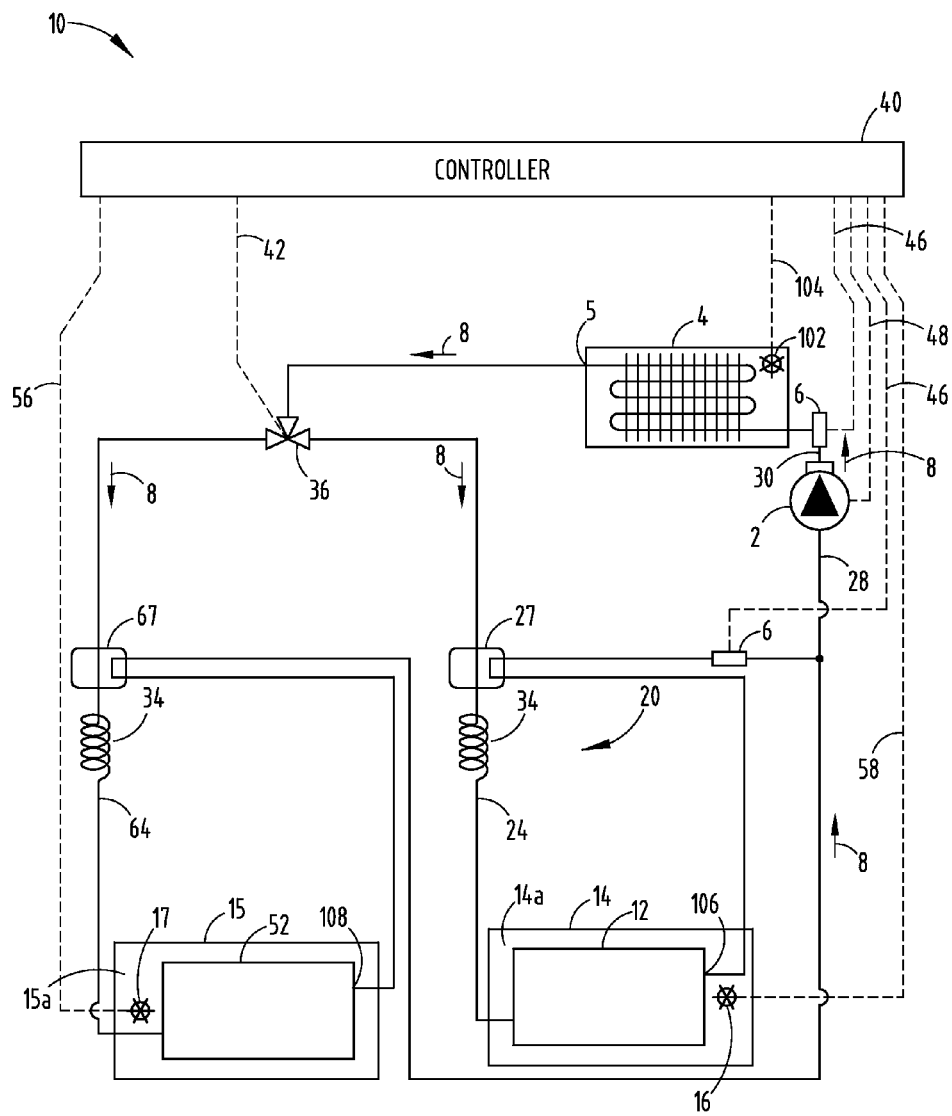
FIG. 12 is a refrigeration circuit diagram depicting a configuration that includes a condenser, a compressor, two evaporators, two refrigeration compartments, a pressure reduction device arranged between each evaporator and the condenser, and an intercooler in thermal contact with a portion of the refrigeration circuit upstream of each pressure reduction device.

Likewise, the dual-evaporator refrigerator appliance embodiments depicted in FIGS. 8, 10 and 12 are similar to the embodiments shown in FIGS. 2 and 4. Again, there is one significant difference. Only one conduit, primary evaporator conduit 24 or 64, is arranged between condenser 4 and each evaporator (i.e., evaporators 12 and 52). Hence, there is one primary evaporator conduit 24 associated with the portion of circuit 20 between first evaporator 12 and condenser 4, and one primary evaporator conduit 64 arranged between condenser 4 and second evaporator 52. Accordingly, there is only one pressure reduction device 34 configured within refrigerant circuit 20 between first evaporator 12 and condenser 4, and one other pressure reduction device 34 between second evaporator 52 and condenser 4.

Since valve system 36 only needs to direct or restrict flow of refrigerant 8 from condenser 4 through one, or both of the pressure reduction devices 34, it can rely on one, three-way valve (e.g., a three-way valve comparable to valve 78 in FIG. 5A). Other types of valves as known in the art may also be used, provided that they serve the same function.

The refrigerator appliance 10 illustrated in FIG. 8 differs from the embodiments shown in FIGS. 2 and 4 in one other respect. This appliance has no heat exchanging element (e.g., heat exchanger 26 or intercooler 27) arranged within refrigerant circuit 20 associated with either first evaporator 12 or second evaporator 52. Consequently, the drain lines from evaporator 12 and second evaporator 52 directly feed into compressor inlet line 28 and have no thermal contact with primary evaporator conduits 24 and 64, or pressure reduction devices 34. Note again, however, that the refrigerator appliances depicted in FIGS. 10 and 12 possess suction line heat exchangers 26 or intercoolers 27, respectively, and that these heat exchanging elements and associated conduits are arranged similar to their counterparts depicted in FIGS. 2 and 4.

The refrigerator appliances 10 illustrated in FIGS. 7-12 can be operated during nominal conditions in virtually the same manner as those detailed for the appliances shown in FIGS. 1-4. For example, each of these appliances rely on controller 40 to operate, adjust and control compressor 2, check valve(s) 6, valve system 36, first refrigeration compartment fan 16, second refrigeration compartment fan 17, damper 18 and/or condenser fan 102 to maintain the temperature in refrigeration compartments 14 and 15 at desired levels.

The appliances 10 depicted in FIGS. 7-12, however, take a different approach to driving refrigerant 8 into an equilibrium state within refrigerant circuit 20 during the initial phase of a compressor-ON cycle. As noted earlier, these appliances do not have secondary evaporator conduits 22 and 62 to bypass the heat exchanging elements 26, 27, 66 and/or 67 arranged within the refrigerant circuit 20. Instead, controller 40 operates the compressor 2 at a priming capacity or speed above the nominal capacity level (or speed) for a priming duration that is predetermined or calculated as a variable. The duration of this step, whether predetermined or calculated as a variable, depends on the same Liquid Line Sub-cooling and Evaporator Exit Superheat criteria outlined earlier in connection with the appliances depicted in FIGS. 1-4.

Preferably, controller 40 operates compressor 2 at a capacity level well above the nominal capacity, which is roughly defined as 35% of the difference between the maximum and minimum capacity levels of the compressor (e.g., 0.35*(4500−1600 rpm)=~1015 rpm). Similar to the heat exchanging bypass operation detailed for the embodiments shown in FIGS. 1-4, the compressor priming operation has the effect of re-distributing refrigerant 8 at a high mass flow rate within circuit 20. Refrigerant 8 that has pooled in first evaporator 12 and/or second evaporator 52 during compressor-OFF cycles is quickly forced closer to an equilibrium state within refrigerant circuit 20 during the priming operation.

Controller 40 can thus generate an effective re-distribution of refrigerant 8 with various above-nominal compressor speeds and capacities. Optimal priming speeds and capacity levels, for example, can depend on some of the same appliance features that drive the appropriate duration of the priming step. For example, the overall length of circuit 20, the quantity of refrigerant 8 used in circuit 20, the size of compressor 2, and other factors can affect the determination of the appropriate compressor priming capacity or speed.

Also note that the priming operation itself is not highly efficient (e.g., high, inefficient compressor power levels are needed to execute the step). But any loss in efficiency associated with the priming step is offset by the overall gain in thermodynamic efficiency. This is because the priming step moves refrigerant 8 into an equilibrium state within circuit 20 (i.e., a state where thermodynamic efficiency is high) in significantly less time than conventionally arranged refrigerator appliances can do so.

Other variants of the refrigerator appliances and associated methods of operation in connection with FIGS. 1-4 and 7-12 are possible. For example, the configurations of refrigerator appliance 10 associated with FIGS. 1-4 can be operated by controller 40 to re-distribute refrigerant 8 within circuit 20 to achieve the Liquid Line Sub-cooling and/or Evaporator Exit Superheat conditions using a combined approach. That is, controller 40 can distribute refrigerant 8 using a combination of priming the compressor at higher-than-nominal capacities or speeds, along with bypassing the heat exchanging member(s). Controller 40 can engage in this combined approach upon the initiation of a compressor ON-cycle for a duration that is predetermined or calculated as a variable. Further, controller 40 can rely on substantially the same criteria as discussed earlier in connection with the FIGS. 1-4 and 7-12 embodiments to set the duration of these operations.

The refrigerator appliances that operate upon the initiation of a compressor ON-cycle with a combined, compressor priming/heat exchanger bypass approach arrange compressor 2 as a multi-capacity compressor. Further, these appliances have dual evaporator inlet conduits configured in parallel between the evaporator (e.g., evaporator 12 as shown in FIG. 1) and the condenser 4. The evaporator conduits 22 and 24 depicted in FIG. 1 offer an example of this basic configuration. These appliances also have a heat exchanging member, such as suction line heat exchanger 26, in thermal contact with only one of the evaporator conduits between the condenser 4 and the evaporator 12 (e.g., see FIG. 1).

It is to be understood that variations and modifications can be made on the aforementioned structure without departing from the concepts of the present invention, and further it is to be understood that such concepts are intended to be covered by the following claims unless these claims by their language expressly state otherwise.

We claim:
1. A refrigerator appliance, comprising:
a first refrigeration compartment;
a condenser;
at least one evaporator in thermal communication with the first refrigeration compartment;
a refrigerant;
a multi-capacity compressor with a maximum capacity, a minimum capacity, and a nominal capacity;
a refrigerant circuit arranged to allow flow of the refrigerant between the condenser, the at least one evaporator and the compressor, the refrigerant circuit comprising a primary and a secondary evaporator conduit arranged in parallel between the condenser and the at least one evaporator;
a primary pressure reducing device configured within the primary evaporator conduit and a secondary pressure reducing device configured within the secondary evaporator conduit, the primary and the secondary pressure reducing devices set at different pressure reduction levels;
a valve system configured within the primary and the secondary evaporator conduits, the valve system capable of selectively directing or restricting flow of the refrigerant through one, or all, of the evaporator conduits arranged in parallel between the condenser and the at least one evaporator;
a suction line heat exchanger in thermal contact with the primary evaporator conduit, but not the secondary evaporator conduit, wherein the thermal contact is either at a location downstream of the valve system and upstream from the primary pressure reducing device or at the primary pressure reducing device further wherein the suction line heat exchanger is configured to transfer heat to the refrigerant circuit down-stream of the evaporator; and
a controller for controlling the valve system and the compressor to maintain the first refrigeration compartment at any of a plurality of selectable temperatures, wherein the controller is configured to distribute the refrigerant in the circuit to effect substantial sub-cooling of the refrigerant in the condenser or superheating of the refrigerant in the at least one evaporator, upon the initiation of a compressor ON-cycle, further wherein the controller is configured to direct the refrigerant through the secondary evaporator conduit to bypass the suction line heat exchanger upon the initiation of the compressor ON-cycle and the primary and secondary evaporator conduits merge upstream of the at least one evaporator.

2. A refrigerator appliance according to claim 1, wherein the controller is further configured to operate the multi-capacity compressor at a priming capacity above the nominal capacity upon the initiation of a compressor ON-cycle.

3. A refrigerator appliance according to claim 2, wherein the nominal capacity is approximately 35% of the difference between the maximum and the minimum capacity of the multi-capacity compressor.

4. A refrigerator appliance according to claim 1, wherein the controller is further configured to operate the multi-capacity compressor at the priming capacity and direct the refrigerant through the secondary evaporator conduit for a duration that is predetermined or calculated.

5. A refrigerator appliance according to claim 1, wherein the primary and secondary pressure reducing devices are selected from the group consisting of capillary tubes, expansion valves, orifice restrictors and needle valves.

6. A refrigerator appliance according to claim 1, wherein the valve system comprises a valve or valves selected from the group consisting of a solenoid driven single inlet and single outlet-type valve, a solenoid driven single inlet and at least one selectable outlet-type valve, and a stepper motor driven single inlet and at least one selectable output-type valve.

7. A refrigerator appliance according to claim 1, wherein the multi-capacity compressor is selected from the group consisting of a variable speed compressor, a variable capacity compressor, a linear compressor and a two-speed compressor.

8. A refrigerator appliance according to claim 1, wherein the suction line heat exchanger is an intercooler that is in thermal contact with the primary evaporator conduit, but not the secondary evaporator conduit, at a location downstream from the valve system and upstream from the primary pressure reducing device.

9. A refrigerator appliance according to claim 1, wherein the suction line heat exchanger is in thermal contact with the primary pressure reducing device, but not the secondary pressure reducing device.

10. A method of operating a refrigerator appliance, the refrigerator appliance having a refrigeration compartment, an evaporator in thermal communication with the refrigeration compartment, a condenser, a refrigerant, a compressor, a refrigerant circuit between the condenser, the evaporator and the compressor, and a primary and a secondary pressure reducing device arranged in parallel within the refrigerant circuit between the condenser and the evaporator, comprising the steps:
  providing a suction line heat exchanger in thermal contact with the portion of the refrigerant circuit between the condenser and the evaporator containing the primary pressure reducing device, but not in thermal contact with the portion of the circuit containing the secondary pressure reducing device;
  transferring heat through the suction line heat exchanger from the portion of the refrigerant circuit between the condenser and the evaporator to a portion of the refrigerant circuit between the evaporator and compressor;
  providing the compressor in a multi-capacity configuration with a maximum capacity, minimum capacity, and a nominal capacity;
  providing a valve system in the refrigerant circuit between the condenser and the evaporator;
  operating the compressor and the valve system to cause flow of the refrigerant through the refrigerant circuit to chill the evaporator during a compressor ON-cycle;
  directing the refrigerant through the secondary pressure reducing device to bypass the suction line heat exchanger upon the initiation of the compressor ON-cycle, wherein the secondary pressure reducing device lacks a heat transfer member;
  operating the valve system and the compressor to maintain the refrigeration compartment at any of a plurality of selectable temperatures; and
  operating the valve system and the compressor to distribute the refrigerant in the circuit to effect substantial sub-cooling of the refrigerant in the condenser or superheating of the refrigerant in the evaporator, upon the initiation of the compressor ON-cycle.

11. The method of operating the refrigerator appliance according to claim 10, wherein the step of operating the valve system and the compressor to distribute the refrigerant in the circuit includes operating the multi-capacity compressor at a priming capacity above the nominal capacity upon the initiation of the compressor ON-cycle.

12. The method of operating the refrigerator appliance according to claim 11, wherein the nominal capacity is approximately 35% of the difference between the maximum and the minimum capacity of the multi-capacity compressor.

13. The method of operating the refrigerator appliance according to claim 10, wherein the step of operating the valve system and the compressor to distribute the refrigerant in the circuit continues for a duration that is predetermined or calculated upon the initiation of the compressor ON-cycle.

14. The method of operating the refrigerator appliance according to claim 10, wherein the primary and secondary pressure reducing devices are selected from the group consisting of capillary tubes, expansion valves, orifice restrictors and needle valves.

15. The method of operating the refrigerator appliance according to claim 10, wherein the valve system comprises a valve or valves selected from the group consisting of a solenoid driven single inlet and single outlet-type valve, a solenoid driven single inlet and at least one selectable outlet-type valve, and a stepper motor driven single inlet and at least one selectable output-type valve.

16. The method of operating the refrigerator appliance according to claim 10, wherein the multi-capacity compressor is selected from the group consisting of a variable speed compressor, a variable capacity compressor, a linear compressor and a two-speed compressor.

17. The method of operating the refrigerator appliance according to claim 10, wherein the suction line heat exchanger is an intercooler in thermal contact with the portion of the refrigerant circuit between the condenser and the evaporator containing the primary pressure reducing device at a location downstream from the valve system and upstream from the primary pressure reduction device.

18. The method of operating the refrigerator appliance according to claim 10, wherein the suction line heat exchanger is in thermal contact with the primary pressure reducing device.

* * * * *